No. 745,651. PATENTED DEC. 1, 1903.
W. G. NEWTON.
SIPHON WATER CLOSET.
APPLICATION FILED MAR. 23, 1903.
NO MODEL. 3 SHEETS—SHEET 3.

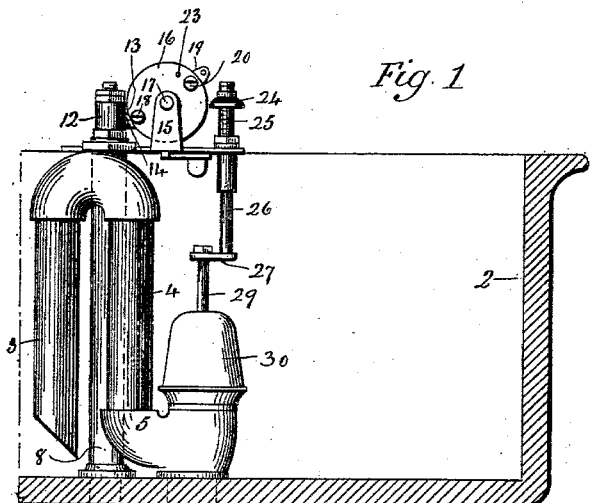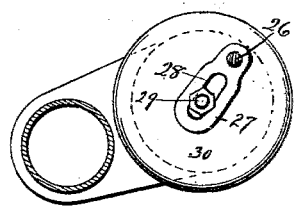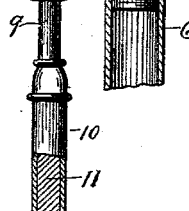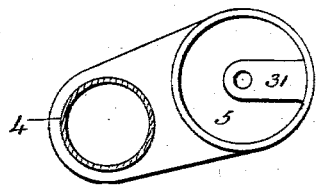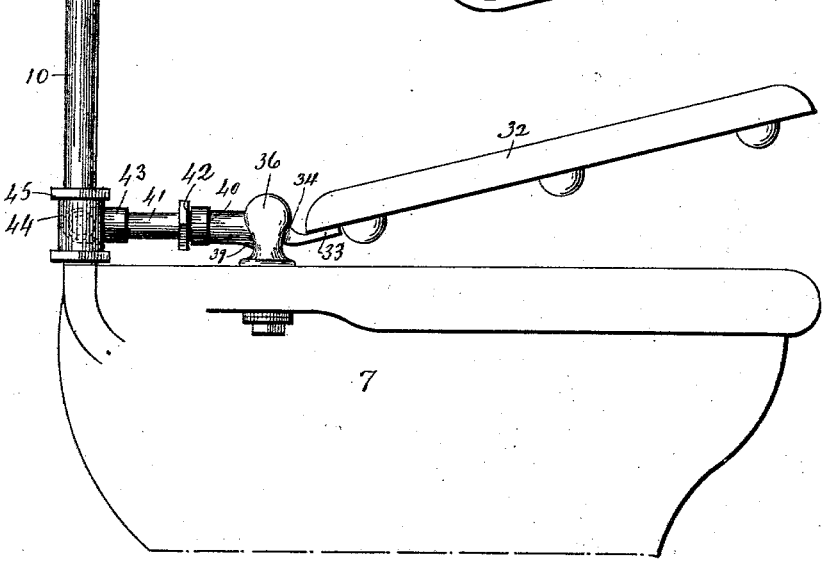

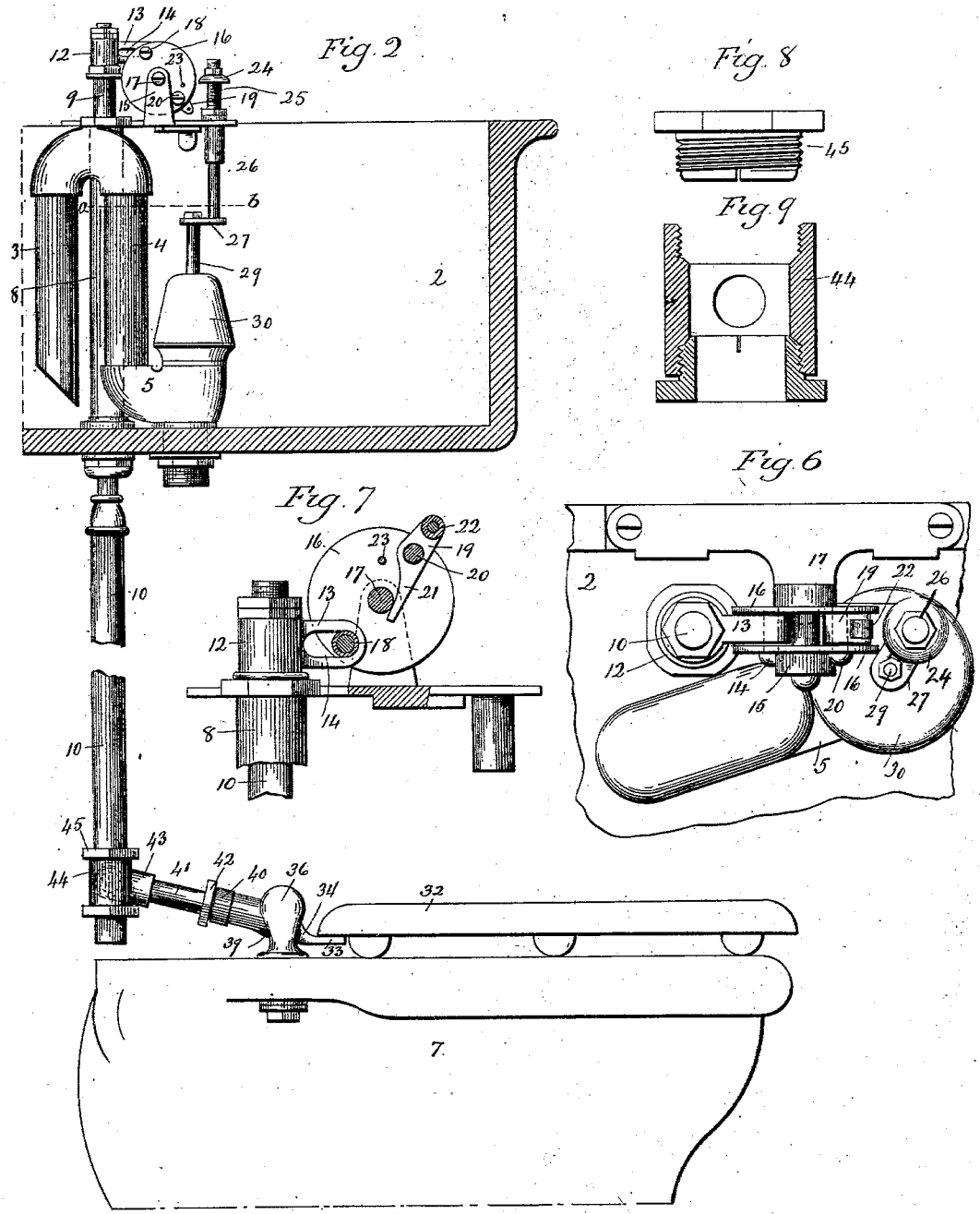

No. 745,651. Patented December 1, 1903.

UNITED STATES PATENT OFFICE.

WILLIAM G. NEWTON, OF NEW HAVEN, CONNECTICUT, ASSIGNOR TO THE PECK BROS. & CO., OF NEW HAVEN, CONNECTICUT, A CORPORATION.

SIPHON WATER-CLOSET.

SPECIFICATION forming part of Letters Patent No. 745,651, dated December 1, 1903.

Application filed March 23, 1903. Serial No. 149,027. (No model.)

*To all whom it may concern:*

Be it known that I, WILLIAM G. NEWTON, of New Haven, in the county of New Haven and State of Connecticut, have invented a new and useful Improvement in Siphon Water-Closets; and I do hereby declare the following, when taken in connection with the accompanying drawings and the letters of reference marked thereon, to be a full, clear, and exact description of the same, and which said drawings constitute part of this specification, and represent, in—

Figure 3:
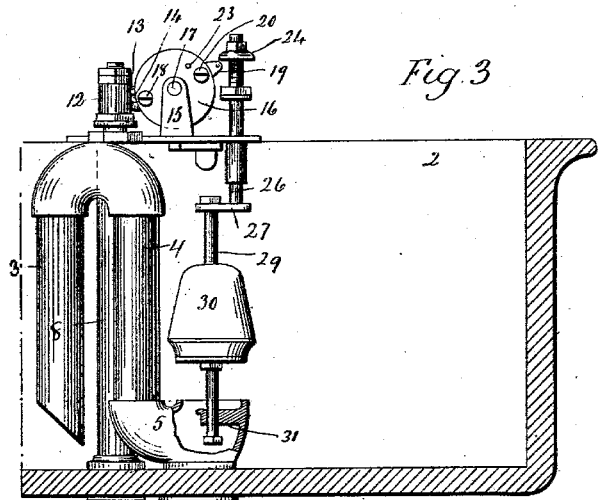
Figure 10:
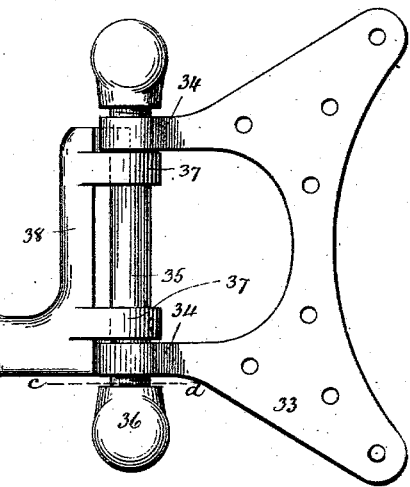
Figure 11:
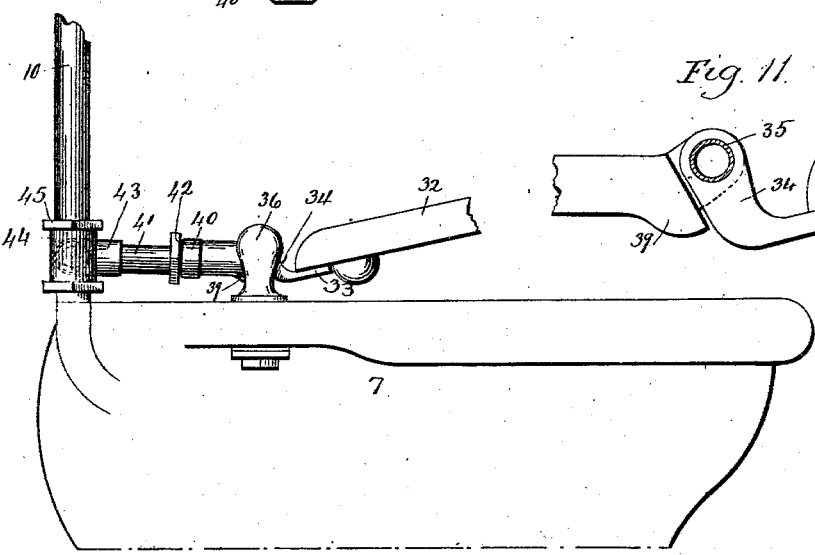

Figure 1, a broken side view showing a portion of the water-closet tank with the discharge mechanism therein and showing the upper portion of the water-closet bowl with the seat hinged thereto and connection between the seat and the discharge mechanism; Fig. 2, a similar view with the seat in its depressed position; Fig. 3, a similar view with the seat in its intermediate position or partly raised, showing the valve for the mouth of the discharge-pipe open, said mouth being partially in section; Fig. 4, a sectional view on the line $a\,b$ of Fig. 2; Fig. 5, a top or plan view of the mouth of the discharge-pipe; Fig. 6, a top view of the tank mechanism; Fig. 7, a side view, partially in section, showing the engagement between the vertically-movable rod and the disk and the dog carried by the disk; Fig. 8, a side view of the split clamping-collar as used for connecting the weighted tube with the hinge mechanism; Fig. 9, a sectional view of such a coupling with the clamping-collar at one end removed; Fig. 10, a top or plan view of the hinge mechanism with the seat removed; Fig. 11, a sectional view on the line $c\,d$ of Fig. 10.

This invention relates to an improvement in siphon water-closets, and particularly to that class which are operated by the seat— that is, those in which the flush-pipe is opened by the lifting of the seat, which is normally held in a raised position, the object of the invention being a construction which permits of the parts to be assembled and adjusted before the tank is placed in position and one which will be positive in its action; and the invention consists in the construction as hereinafter described, and particularly recited in the claims.

As herein shown, my improved mechanism is used in connection with the usual tank 2, which is filled with water in the usual manner. Within this tank is the usual siphon consisting of vertical tubes 3 4, connected together at the top, the tube 3 being open at the bottom and the tube 4 opening into a mouth 5, which discharges through the usual outlet 6 to the bowl 7. Mounted in the tank is a vertical tube 8, through which a rod 9 extends. This rod is connected at its lower end, which projects below the tank, with a tube 10, which is filled with lead 11 or other suitable material, this tube being connected at its lower end with the seat-hinge mechanism, which will be hereinafter described. At the upper end of the rod 9 is a collar 12, free to turn upon the rod, but held against longitudinal movement. From one side of this collar a finger 13 projects, in which is a slot 14. Mounted upon the upper edge of the tank is a bracket 15, which supports two disks 16, mounted for rotation upon a transverse pin 17, and these disks are connected with the finger 13 by a screw or pin 18, which passes through the disks and through the slot 14 and so that the vertical movement of the rod 9 will turn the disks. Between the disks and opposite the point of connection with the finger 13 a dog 19 is hung upon the screw or pivot 20. This dog is formed with a tail 21, which extends beneath the pin 17, upon which the disks turn, and in the outer end of the dog a roller 22 is mounted. To prevent the dog being thrown beyond the operating position, a transverse pin 23 is arranged between the disks in the path of movement of the outer end of the dog. This dog is adapted to engage with a nut 24, adjustably mounted upon the screw-threaded end 25 of the vertically-movable rod 26, this rod being connected at its lower end with a link 27, having a slot 28, through which a valve-spindle 29 extends. Upon this spindle 29 is a float-valve 30, adapted to close the mouth 5, and in this mouth is a web 31, through which the spindle 29 extends and so as to be guided thereby.

The hinge mechanism for the seat 32 consists of a plate 33, screwed to the under side of the rear edge of the seat and formed with upwardly-extending arms 34, through which a transverse bar 35 extends, this bar being reversely threaded at its ends for engagement with posts 36, mounted upon the bowl 7. Also mounted upon the bar 35 between the arms 34 are knuckles 37 of an arm 38, which at one end is formed with a lug 39 for engagement by one of the arms 34 of the plate 33. This arm 38 stands at right angles to a socket 40, which receives one end of a tube 41, which is clamped in the socket by means of the well-known slip-joint, which includes a split collar 42 on the tube 41 and adapted to enter the socket 40 to clamp the tube 41 therein.

The rod 41 is connected at its outer end with a hub 43, which is swivelly connected with a double-ended friction-coupling 44, internally threaded at its opposite ends to receive split collars 45, through which the weighted tube 10 passes and by which the coupling 44 is connected at any desired point with the said tube 10.

In their normal position the parts stand, as shown in Fig. 1, with the seat raised and the rod 9 in its lowermost position, in which it is held by the weighted tube 10, which also holds the seat in its raised position. Upon depressing the seat the arm 34, engaging with the lug 39, lifts the socket 40, and hence the head 43 and coupling 44, which being connected with the tube 10 raises the rod 9 and turns the disks 16, in which turning the dog 19 is tripped by the nut 24, so as to pass beneath it, as shown in Fig. 2. The seat then being released is raised by the action of the weighted tube 10, which also draws the rod 9 downward, turning the disks 16 in the opposite direction and raising the dog, the tail of which engaging the pin 17, as shown in Fig. 7, causes the dog to engage with the nut 24 and lift the rod 26, which raises the float-valve 30, opening the mouth 5 and allowing the water in the tank to pass into the flush-pipe 6. This passage of water into the mouth 5 starts the siphon action through the pipes 3 4.

By the continual turning of the disks the dog soon releases the nut 24 and allows the rod 26 to drop; but owing to the fact that the valve 30 is a float-valve it does not immediately fall to its seat and close the mouth 5, but remains suspended momentarily to insure a sufficient flow of water into the mouth 5 to start the siphon action through the tubes 3 4. This having been started, the downward suction will draw the float to its seat and close the mouth 5, the tank being then emptied through the tubes 3 4 in the usual manner, and the parts again assume the normal position, as shown in Fig. 1.

By connecting the posts 36 with the right and left hand threaded bar I readily provide for variations which may occur in the location of openings in the bowl for the reception of the hinge-posts. By arranging the slip-joint connection between the hinge and weighted tube provision is readily made for variation in distances between the location of the bowl and the tank. With this construction also the tank mechanism may be set up and adjusted by the manufacturer, so as to be ready for operation when placed in position without requiring any particular adjustment—only such adjustment as can be readily made by workmen of ordinary intelligence.

The use of a weighted tube avoids the necessity of a spring-hinge, and therefore is uniform in tension and positive in operation.

Having fully described my invention, what I claim as new, and desire to secure by Letters Patent, is—

1. The herein-described tank mechanism for water-closets including a rotatable disk mounted at the upper edge of the tank, a vertically-movable rod connected at its upper end with said disk and at its lower end with the seat whereby the movement of the seat will turn said disk, a dog carried by said disk, and a float-valve having an upwardly-extending rod with a movable nut at the upper end thereof in the path of said dog whereby by the turning of the disk the dog will lift the float-valve and open the mouth of the discharge-pipe substantially as described.

2. The herein-described tank mechanism for water-closets comprising a rotatable disk mounted at the upper edge of the tank, a vertically-movable rod having connection at its upper end with said disk, a weight surrounding said rod, a dog pivotally connected with said disk, a vertically-movable valve-rod adapted to be raised by said dog, said valve-rod connected with a slotted link at its lower end through which engagement is made with the valve-spindle, said valve-spindle extending into the mouth of the discharge-pipe, a float-valve free to move the said spindle and adapted to close said mouth, and connection between the seat and said vertically-movable rod whereby the movement of the seat will turn said disk and lift the said float-valve substantially as described.

3. The herein-described tank-mechanism for water-closets comprising a disk mounted at the upper edge of the tank, a vertically-movable rod for turning the said disk, means carried by said disk for opening the valve in the mouth of the discharge-pipe, a seat hinged to the water-closet bowl, a socket in connection with said hinge, said socket coupled with said vertically-movable rod by a slip-joint consisting of split collars, and a coupling to receive them whereby adjustment may be made, substantially as described.

In testimony whereof I have signed this specification in the presence of two subscribing witnesses.

WILLIAM G. NEWTON.

Witnesses:
T. S. COLEMAN,
H. T. BATTIN.